Jan. 15, 1924.  1,480,866
J. W. SMITH
AIR COOLING OF INTERNAL COMBUSTION ENGINES
Filed June 24, 1920    6 Sheets-Sheet 1
FIG. I.
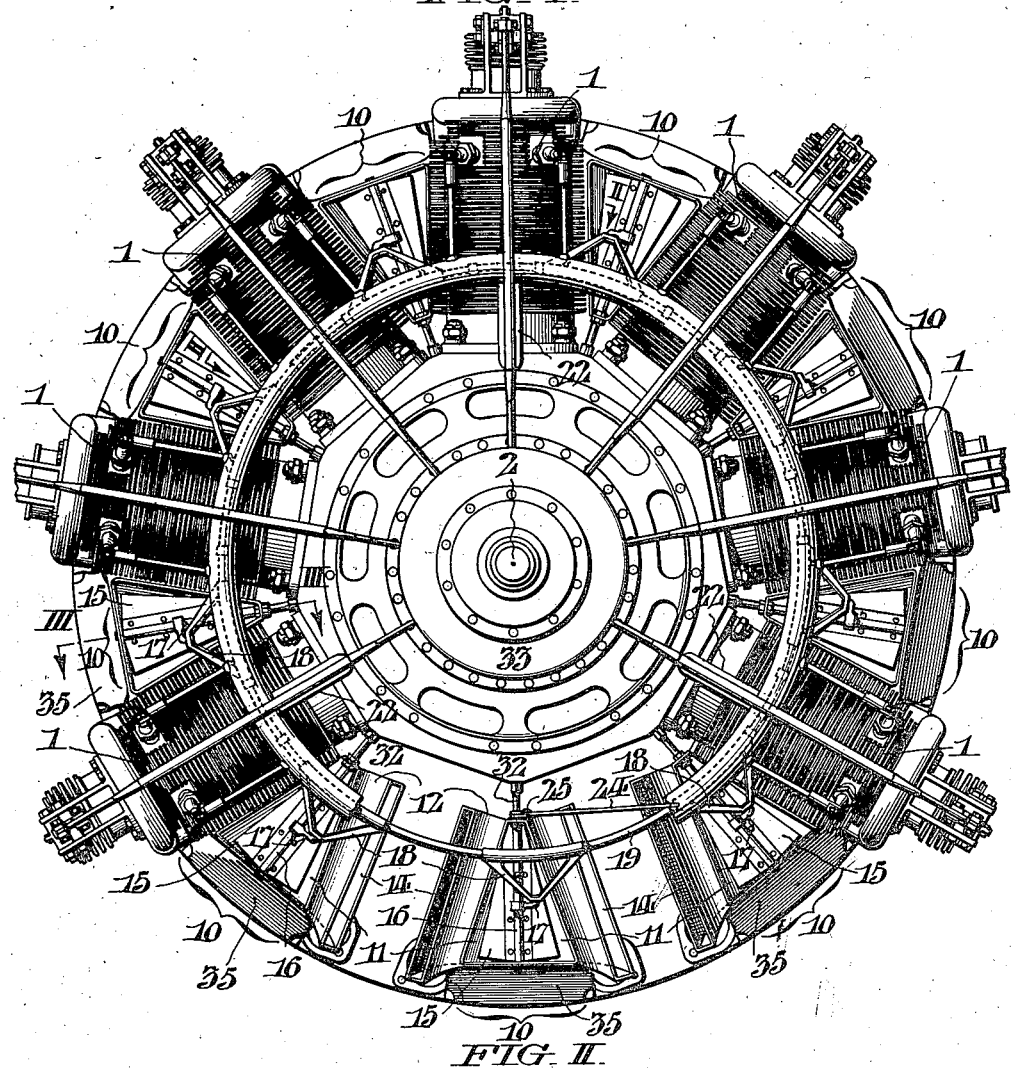
FIG. II.
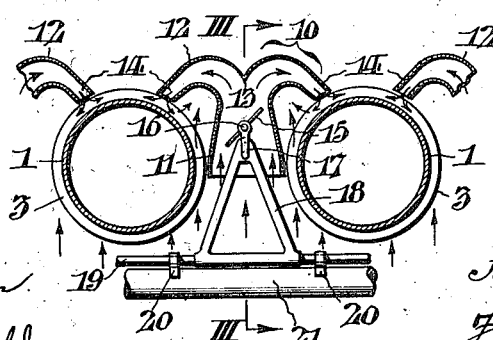
WITNESSES:  INVENTOR:
            John W. Smith,
            BY
            ATTORNEYS.

Jan. 15, 1924. 1,480,866
J. W. SMITH
AIR COOLING OF INTERNAL COMBUSTION ENGINES
Filed June 24, 1920 6 Sheets-Sheet 2
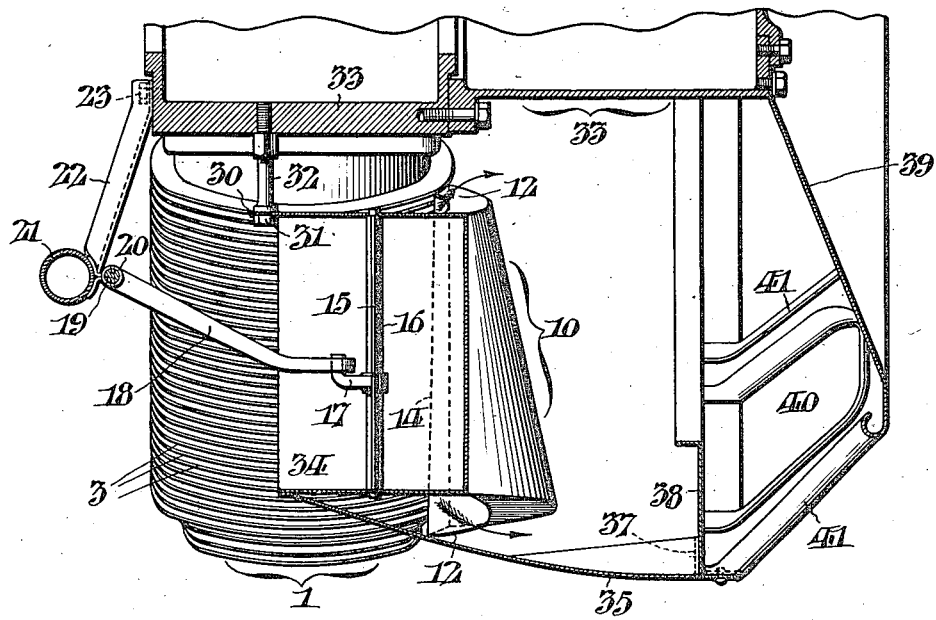
FIG. III.
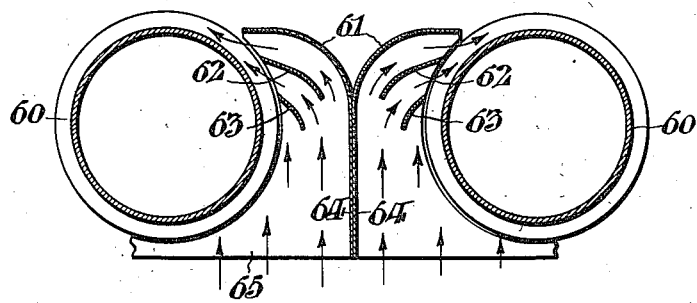
FIG. VII.

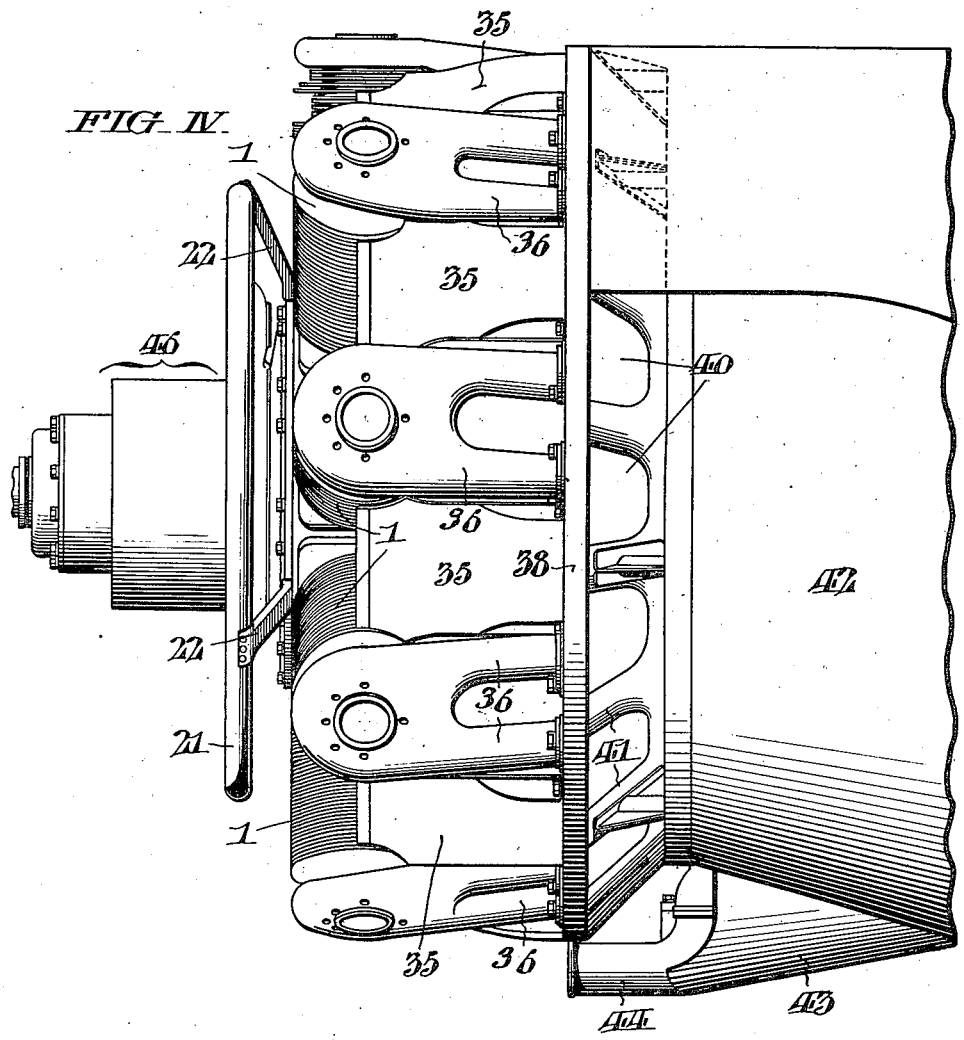

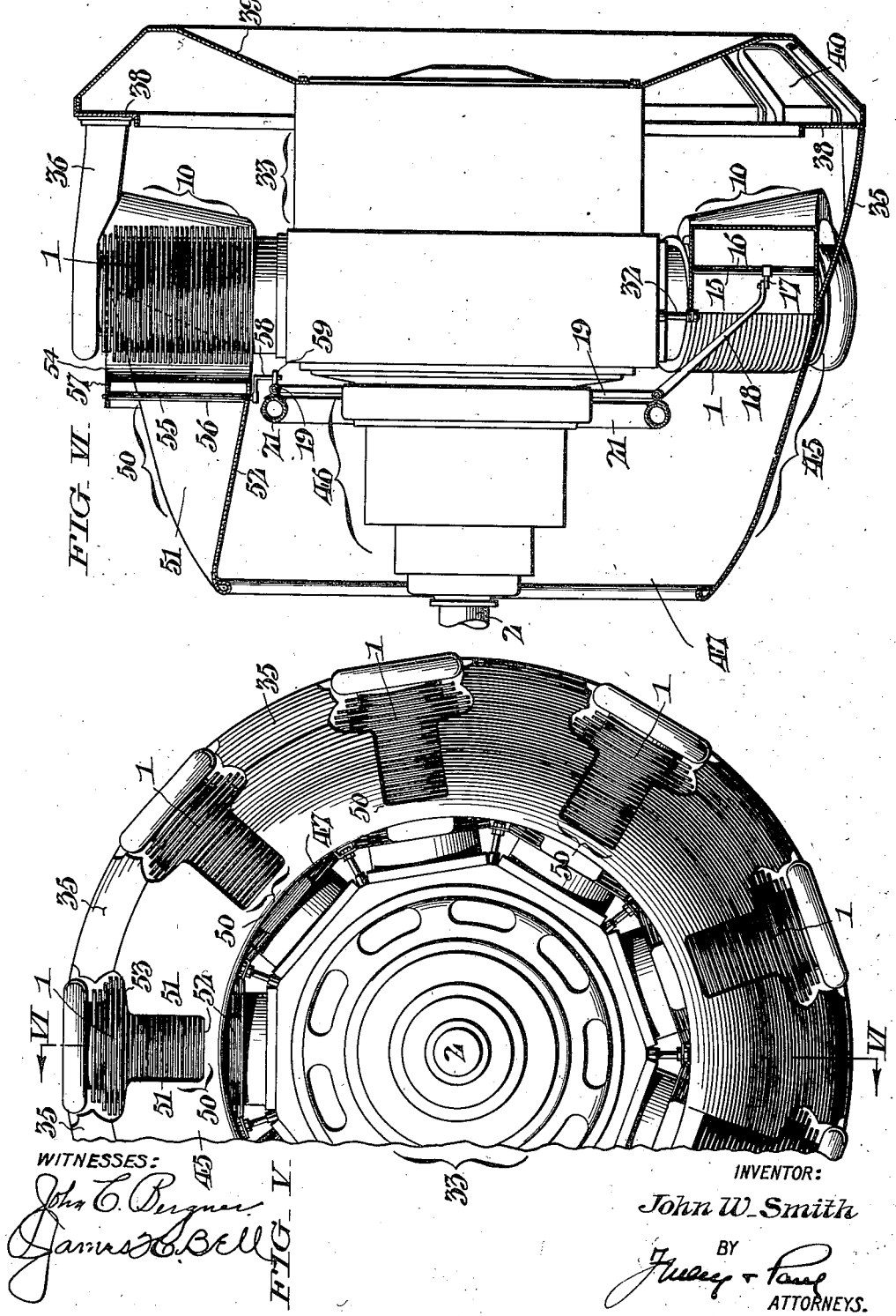

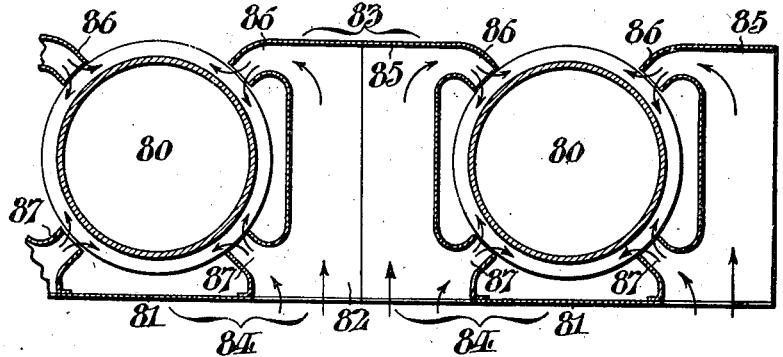
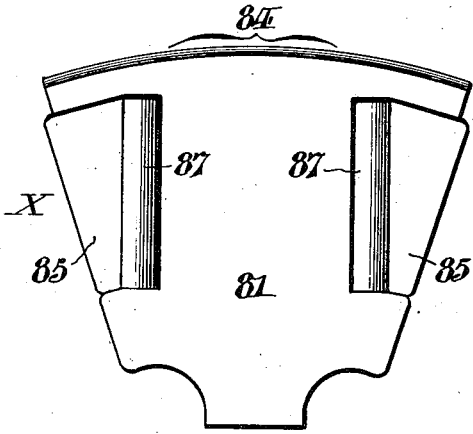
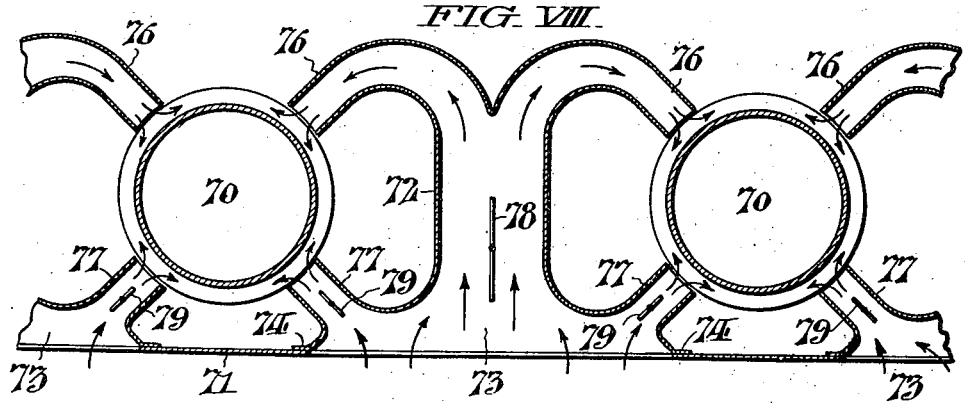

Jan. 15, 1924. 1,480,866
J. W. SMITH
AIR COOLING OF INTERNAL COMBUSTION ENGINES
Filed June 24, 1920 6 Sheets-Sheet 6
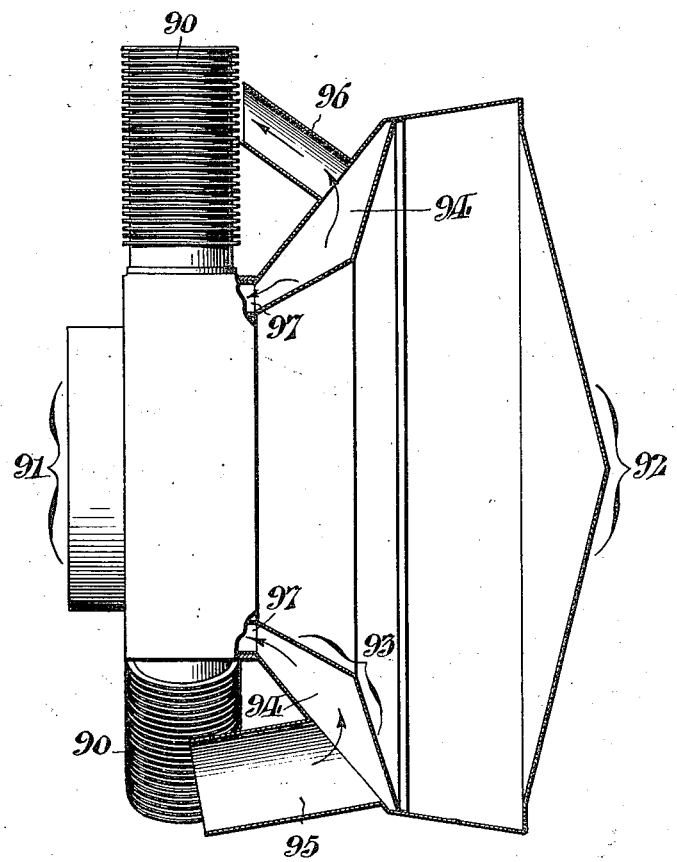
FIG. XI.
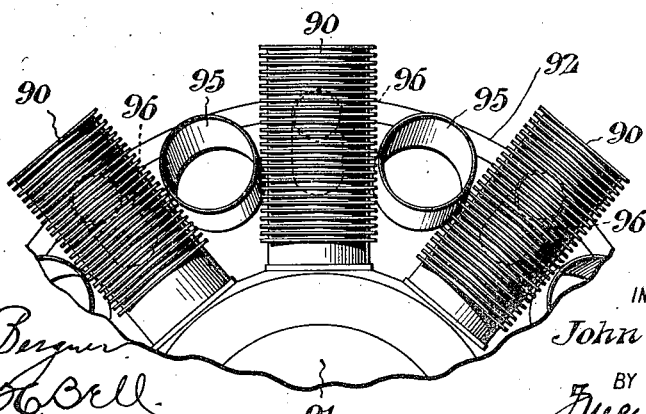
FIG. XII.
WITNESSES
INVENTOR:
John W. Smith,
BY
ATTORNEYS.

Patented Jan. 15, 1924.

1,480,866

UNITED STATES PATENT OFFICE.

JOHN W. SMITH, OF PHILADELPHIA, PENNSYLVANIA.

AIR COOLING OF INTERNAL-COMBUSTION ENGINES.

Application filed June 24, 1920. Serial No. 391,459.

*To all whom it may concern:*

Be it known that I, JOHN W. SMITH, a citizen of the United States, residing in Philadelphia, in the county of Philadelphia and State of Pennsylvania, have invented certain new and useful Improvements in Air Cooling of Internal-Combustion Engines, whereof the following is a specification, reference being had to the accompanying drawings.

My invention relates to the air cooling of internal combustion engines, and especially to cooling by air currents due to relative movement of the engine and the surrounding air. Cooling by virtue of such aerial travel or relative movement of the engine and the air about it is peculiarly advantageous for engines on rapidly moving vehicles or craft, where the air currents employed may be due either to movement of the vehicle or craft carrying the engine, or to movement of the air by the propeller past the vehicle or craft when stationary. Obviously, the invention lends itself especially to the cooling of the engines of aeroplanes, hydroplanes, and dirigibles, etc., and I have hereinafter explained its principles and described its best embodiments at present known to me with special reference to aeroplane use.

Air cooled aeroplane engines of large horse power have hitherto proved highly unsatisfactory, because of unreliable and unequal cooling of the cylinders and exhaust valves. This unequal cooling is a consequence of the natural conditions of aeroplane service, in which a strong draft or current of air due to the travel of the aeroplane impinges more or less uniformly on the front or fore side of the cylinder or cylinder structure, while at the aft or rear side of the cylinder an eddy is created which gives either very imperfect cooling or practically no cooling at all. This unequal cooling causes distortion of the cylinders and produces leakage of the combustible mixture or gas past the pistons to such an extent as makes a really efficient aeroplane engine impossible. By my invention, however, these and other difficulties due to unequal cooling can be overcome in a highly efficient manner, by means of the draft or air currents due to relative movement of the aeroplane and the surrounding air, and without any necessity for the use of a blower or the like to create an air blast. Cooling of both the front and the rear sides of the cylinders can, furthermore, be accomplished by impingement of fresh, unheated air against them, so that each cylinder or cylinder structure as a whole is cooled in a thoroughly uniform manner. It is possible to accomplish all this, furthermore, without enlargement of the fuselage beyond the size demanded by good practice, and also without interference with the stream line encasement or cowling of the fuselage so important in aeronautic structures.

In the drawings, Fig. I is a view head-on of an aeroplane engine with provision for air cooling of its cylinders in accordance with my invention,—the engine being here shown with two cylinders removed in order to render visible the parts behind them.

Fig. II is a somewhat diagrammatic developed fragmentary view from the left of Fig. I with various parts in section at a cylindrical surface corresponding to the line II—II in Fig. I, illustrating especially the diverting and guiding or directing of the cooling air to the rear of the cylinders.

Fig. III is an enlarged fragmentary view of one of the engine cylinders and the associated parts, certain parts being in section at a plane corresponding to the line III—III in Figs. I and II, and one of the parts being in a slightly different position.

Fig. IV is a side elevation of the structure shown in Fig. I, certain minor parts being omitted and the front portion of the fuselage proper being shown.

Fig. V is a fragmentary head-on view similar to Fig. I showing the engine, cowling, and other structures there illustrated with an additional casing or cowling section so associated therewith as to partially cover the front of the engine,—some of the valves and other accessory structures and parts being omitted for the sake of clearness.

Fig. VI shows a mid-section through the cowling and conduit structures of Fig. V, at a plane of section corresponding to the line VI—VI in Fig. V (the engine crank casing and accessory parts being shown in silhouette merely) with minor modifications and omissions of certain parts, only the cowling inset in the plane of section being shown.

Fig. VII is a developed diagrammatic section view, similar to Fig. II, but on a larger scale, illustrating different conduit means for diverting and guiding or directing the cooling air to the rear of the engine cylinders.

Fig. VIII is a somewhat diagrammatic developed sectional view, similar to Figs. II and VII, showing a modified form of construction.

Fig. IX is a view similar to Fig. VIII illustrating another modification.

Fig. X is a front view of a portion or unit section of the structure illustrated in Fig. IX.

Fig. XI is a view, similar to Figs. IV and VI, showing a different form of construction with certain parts in mid-section at an axial plane, and with various accessory and other parts not essential to the understanding of the present invention omitted.

Fig. XII is a fragmentary head-on view (from the left of Fig. XI) of the structure illustrated in Fig. XI.

The engine shown in Figs. I, II and III is a multiple cylinder one of the familiar radial or coplanar type, in which the cylinders 1 are arranged starwise about a common shaft 2 in more or less nearly or exactly a common plane. These cylinders are provided with the usual radiating fins 3, as well as with admission and exhaust valves, valve gear, ignition devices, etc. These parts may be of types common and well understood in this art, and hence require no detailed description.

As shown in these figures, the engine cylinders or cylinder structures 1 are freely and fully exposed at their forward sides, so as to be cooled by direct external impingement of the air currents due to relative movement of the engine and the surrounding air,—whether by virtue of the travel of the aeroplane when in flight, or owing to the draft from the propeller when the aeroplane is stationary. In order to cool the cylinders at their rear, I provide for receiving, diverting or guiding and directing upon them air from these same currents,—preferably air fresh and unheated by previous contact with other portions of the engine or its cylinders. As here shown, this is done by means of a conduit structure 10 located between and behind each pair of cylinders and opening or directed forward, so as to receive air from the current past the cylinders and to direct the air so received upon the rear of the cylinders to the exclusion of air heated by previous contact with their forward portions. As shown, the forward-directed receiving ends of the conduit structures 10 are flared or expanded at 11, in order to augment their funnel action in gathering the air. At its rear, the conduit structure 10 branches and extends laterally behind each of the adjacent cylinders, these lateral extensions 12 being curved or bent around from the acute angle 13 where their walls come together in the centre to divide the air stream within the conduit. As will be clearly seen from the lower portion of Fig. I, where two of the cylinders are omitted, and from Figs. II and III, the lateral extensions or branches 12 of the conduit structure 10 terminate in elongated openings 14 which are directed diagonally forward (at about a 45° angle) and serve as nozzles for discharging and directing cooling blasts or jets of air forward against the rear of the cylinders from behind them. From Figs. II and III, it will be observed that the curved nozzle branches 12 of the conduit structure 10 are spaced away from the adjacent sides of the cylinders so as to afford passage lengthwise of the cylinders for the escape of spent air from in front that has served to cool the cylinders, as well as of a portion of the spent air from the nozzles 14. It will be seen that since each conduit structure 10 has nozzles 14 discharging an air blast or jet from the rear against two adjacent cylinders, each cylinder is cooled by two such blasts or jets, one at or from either side. The forward directed air blast from the nozzles 14 serve to prevent air that has impinged upon and been heated by the front portion of the cylinder from coming in contact with its rear portion; and this result is also favored by the escape of spent air lengthwise of the cylinders as permitted by the arrangement of the nozzle branches 12.

Still referring to Figs. I, II, and III, it will be seen that in the rearward-extending trunk or funnel of each conduit structure 10 is mounted a damper-like butterfly valve 15, of triangular or sector-like shape corresponding to the cross section of the trunk, by means of which the air blasts to the rear of the cylinders can be regulated or shut off. These dampers 15 are shown partially open in Figs. I and II, but completely closed in Fig. III. Each damper 15 is mounted on a shaft 16 carrying a crank 17 whose free end is pivotally connected to an open triangular bracket-arm 18 (Figs. I and III) supported on a ring member 19 mounted in front of the engine cylinders 1 in such a way as to permit of its movement concentrically with the shaft 2. As shown, this ring 19 is supported and guided in lugs 20 attached to an annular conduit structure 21 which contains the wiring of the ignition system of the engine, and is, in turn, attached to brackets 22 bolted to the front of the engine crank-casing at 23 (Fig. III). As shown at the bottom of Fig. I, a sheathed wire flexible actuator 24 is connected to one of the brackets 18, this actuator 24 passing rearward at 25 within reach of the mechanician. By this means, therefore, the dampers or valves 15 can be moved in unison at will.

Referring, now, to Figs. I, and III, it will be seen that the conduit structures 10 (which may be of sheet metal) have, at their front inner corners, forward-projecting lugs 30 which are secured by clamp nuts 31 on studs or posts 32 screwed into the engine casing 33. The conduit structures 10 are additionally secured in place by attachment of their outer edges 34 (constituting, in effect, the "bases" of their triangular funnel mouths) to the forward edges of plates 35 (see Fig. IV) which approximately fill the spaces between the bifurcated cylinder exhausts 36 and are appropriately notched or cut away at their forward corners to fit between the adjacent rear portions of the cylinders 1. In the aggregate, the pieces 35 are of frusto-conoidal form, so as to constitute, in effect, a stream-line cowling or casing section mutilated to accommodate the protruding exhaust 36,—themselves of rounded, approximately stream-line forms. The plates 35 are reinforced, at their rear ends, by brackets 37 by means of which they are secured to the forward side of a flat annular web 38, flanged Z fashion, that surrounds the rear portion of the crank case 33. To the rear of this web 38 is secured the outer edge of a dished annular plate 39 whose inner edge is secured to the rear end of the engine casing 33. The outer conical portion of the plate 39 has large openings 40 therein, (excepting at its upper portion) and the metal at the edges of these openings is inwardly curled so as to convert that between them into strong, rigid, spoke-like bracket arms 41. It will be seen, therefore, that the heated air which has served to cool the cylinders 1 at front and rear passes inside of the annular web 38 and escapes diagonally outward from the outer edge of the plate 39, through the openings 40, as well as between the bifurcated branches of the exhaust 36. The stream-line fuselage 42 (of nearly circular cross-section in front) is secured against the rear side of the dished plate 39, its cylindrical upper portion merging with the rear edges of the plates 35, while its lower portion diminishes conically in cross section so as not to overlap abruptly the openings 40. At the bottom of the fuselage is a frusto-conical swell 43 that serves to stream-line the forward-directed carbureter intake 44.

Figs. V and VI illustrate the engine and cooling system, etc., of Figs. I, II and III supplemented with an additional casing or cowling section 45, of frusto-conoidal stream-line form, mounted in front of the plates 35 and of the cylinders 1. This cowling section 45 extends forward with diminishing size ahead of the cylinders 1 a sufficient distance to enclose the front portion 46 of the engine casing 33 and its associated parts completely, but is centrally open in front to admit the air current or draft,—the edge of the opening 47 being curled inward for reinforcement. As shown, the diameter of the front opening 47 is about that of the crank casing 33 at the bases of the engine cylinders 1 (or a little larger), and there is plenty of room within the cowling section 45 for the air entering at said front opening to flow rearward and outward around the reduced forward portion 46 of the engine casing 33 in order to pass between the cylinders 1 to the conduit structures 10. The rear edge of the cowling section 45 fits and is secured over the front edge of the plate section 35, and the outer surfaces of the sections 35 and 45 practically merge, it will be seen, in one casing or cowling structure of substantially or approximately stream-line form or shape appropriate for the front end of the aeroplane fuselage.

In front of each engine cylinder 1, the cowling section 45 has a forward-open inset 50 that permits free access to said cylinder, and direct impingement thereon, of the air currents due to aerial travel or relative movement of the engine and the surrounding air. As clearly shown in Figs. V and VI, these insets 50 have parallel side walls 51, and also a floor or bottom wall 52 that slopes slightly inward (with reference to the engine shaft 2) towards the cylinders 1,—the walls 51 and 52 thus forming, in effect, a square-built trough of gradually increasing depth rearward. The rear edge of the cowling section 45 is notched or cut away at 53 (like the front corners of the cowling plates 35) to conform to the curved outline of the cylinders 1 and their radiating fins 3, and the side walls 51 of the ventilating insets 50 have correspondingly bent and curved extensions 54 rearward around the cylinders 1, so as to guide and separate the air currents through the insets 50 and the air flow through the front opening 47 to the conduit structure 10. The rear edges of the curved extensions 54 of the inset walls 51 are clearly shown in dotted lines in Fig. VI.

When the engine is shut off for gliding or coasting, overcooling of the cylinders 1 at the rear may be prevented by complete closure of the dampers 15, so as to prevent flow or access of cooling air to them through the nozzles 14. In order, likewise, to substantially prevent flow or access of cooling air to the front of the cylinders, a balanced damper valve 55 may be pivoted at the rear end of each trough-like ventilating inset 50, on a shaft 56 having an outboard bearing in a square U-shaped yoke 57 across the rear end of the inset 50 and extending through the bottom 52 of the trough 50 with an inboard bearing therein. As shown, the dampers 55 may be operated concurrently and pari passu with the dampers 15, by means of cranks 58 mounted on the inner ends of the shafts 56 and having pin and slot connections with brackets 59 on the ring 19 that actuates the dampers 15 through similar pin and slot connections of its bracket arms 18 with their cranks 17. The upper ends of the dampers 55, it will be seen, extend up above the cowling 45 sufficiently to protect the protruding outer ends of the cylinders 1. This protection may be supplemented and made completely effective by upward projection of the curved rearward extensions 54 of the ventilating trough side walls 51 to the same height as said dampers 55, as shown in Fig. VI.

From Fig. VI, it will be seen that the exhaust pipes 36 of the cylinders 1 discharge through the annular web 38 into the annular trough formed thereby, so to speak, in front of the dished rear plate 39, so that the exhaust gases from the cylinders are discharged through the openings 40 in said plate 39 along with the spent and heated cooling air.

Fig. VII shows a modified form of construction in which the conduit structures or deflecting and guiding means associated with each of the cylinders 60 comprise any suitable number of suitably curved plates or vanes 61, 62, 63 (resembling stationary turbine buckets) that divert and direct the air currents past the cylinders against their rear in the manner indicated by the arrows,— the rearmost discharge portions of these vanes extending in a direction tangential to the rear walls of the cylinders. Taken, together, the set of vanes 61, 62, 63 constitutes a nozzle or nozzles resembling the continuous nozzle row formed by the stationary blades or guides of a steam turbine, and acts in a similar manner to guide and discharge the air against the cylinder walls in a jet or blast. The outermost vane or guide plates 61 for adjacent cylinders 60 are shown back to back, with straight portions 64 extending forward to a point in front of the cylinders. In the drawings, the guide plates 61, 62 are seen outer ends-on; their inner ends (to describe them according to the analogy of turbine blades or buckets) are in proximity to the periphery of the engine crank-case 65, just like those of the curved walls of the conduit structure 10 of Figs. I to III. The structure is simpler than that of Figs. I, II, and III, though somewhat less efficient, perhaps.

Fig. VIII shows another modified form of construction in which the cylinders 70 are not directly exposed in front, but masked by a plate 71. The conduit structure 72 extend forward to this plate 71 and have widely flaring or expanded funnel mouths 73 whose edges are secured at 74 to the edges of corresponding openings in said plate. Besides the nozzle branches 76 directed diagonally forward (at about a 45° angle) to cool the rear of the cylinders 70, there are other nozzle branches 77 opening from the conduit mouths 73 and directed diagonally rearward (at about a 45° angle) to cool the front of the cylinders. The plate 71, it will be seen, is spaced from the front cylinder walls sufficiently to afford passage lengthwise of the cylinders for escape of a portion of the air from the nozzles 77, and the sides of the conduit trunk extending rearward (with uniform cross-section) from the conduit mouths 73 to the nozzle branches 76 are spaced from the side walls of the cylinders to afford similar passage for the escape of the rest of the air from the nozzles 77 and part of that from the nozzles 76. As a whole, it will be seen, this construction affords the most uniform and equal cooling of the cylinders 70 on all sides. When the engine is shut off for gliding or coasting, overcooling of the cylinders 70 can be prevented by closing balanced damper valves 78 and 79 in the trunk 72 leading rearward to the nozzle branches 76 and in the nozzle branches 77 themselves, so as to prevent flow or access of cooling air to the cylinders at either front or rear.

Figs. IX and X show a further modification differing from that of Fig. VIII principally in the sectionalization of the conduit structure. As shown, the sectional unit basis is the individual cylinder 80 and the unit section comprises a front plate 81 in the form of a mutilated sector "notched" at each side to accommodate half the flared or expanded mouth 82 of the conduit 83 on that side of its cylinder 80. The complete conduit 83 between any two cylinders 80 is, therefore, formed by part of the conduit structure section 84 associated with each of them. The conduit 83 has a flat rear wall 85 instead of the two curved and intersecting rear surfaces of the nozzle branches of Figs. I, II, III, and VIII, so that the horizontal section of the conduit 83 is almost a rectangle with the rear and front nozzles 86 and 87 opening from its front and rear corners. This conduit 83 is, moreover, relatively much wider than that shown in Fig. VIII.

In Figs. XI and XII, the engine cylinders 90 are arranged radially about a crank casing structure 91. At the rear of the crank casing 91 is secured a casing structure 92 similar in general form and function to the rear portion 35 of the outer casing shown in Figs. II and V,—but not here shown as of stream-line form. Toward the front of this casing structure 92, just behind the engine casing 91, is secured an annular diaphragm 93, of double frusto-conical form, which coacts with the conical front wall of the casing 92 to form therein an annular chamber or conduit 94. From this chamber or conduit 94, intake "funnels" 95

(here shown without flare) are directed forward (with some slight outward inclination) between adjacent cylinders 90 to receive and divert to said chamber 94 air from the currents passing between said cylinders. From this same annular chamber 94, other conduits 96 extend forward with considerable outward slope, so as to serve as nozzles for directing and discharging against the rear of the cylinders 90 blasts or jets of air received into the annular chamber 94 through the intakes 95. By the conduit means 95, 94, 96, therefore, the cylinders 90 are effectually cooled at their rear with fresh, unheated air (in a manner quite similar to that already described with reference to the cylinders of Fig. I, etc.), while they are cooled in front by direct impingement of air due to the aerial travel of the engine. As shown, furthermore, there are at the front of the annular chamber 94 openings 97 through which air may enter the crank casing to cool the interior of the cylinders 90 and other parts therein in a manner well understood in the art.

Having thus described my invention, I claim:

1. In aircraft including an internal combustion engine, the combination with a cylinder of an air conducting means aligning longitudinally therewith comprising a portion directed forwardly with respect to the direction of flight to receive air therein by virtue of the movement of the craft, and a continuing portion located at the rear side of the cylinder and directed forwardly with respect to the direction of flight so as to pilot cool air for impingement directly radial against the back of said cylinder and in such a manner as to prevent external air, heated by passage around the cylinder, from hugging the walls of the cylinder around the rear side, through opposition to the flow of such heated air effected by the flow of cool air issuing from the forwardly directed portion.

2. In aircraft, including an internal combustion engine, the combination with a cylinder of an air conducting structure aligning longitudinally therewith and comprising a comparatively large receiving end directed forwardly with respect to the direction of flight to receive air therein by virtue of the movement of the craft, and a continuing portion terminating in a relatively smaller end forming a nozzle which is located at the rear side of the cylinder and directed forwardly with respect to the direction of flight and substantially radially with respect to the cylinder so as to pilot cool air for impingement directly upon and against the cylinder to cool the rear side and to prevent the formation of a completely enveloping blanket of heated air incidental to the tendency of the external air current to hug the walls of the cylinder, and means for controlling the flow of air through said structure.

3. The combination with an aerially traveling multiple cylinder internal combustion engine of radial or coplanar type; of a casing or cowling structure about said engine of substantially stream-line form extending with diminishing size ahead of the engine cylinders, said casing being open in front, and having forward-open insets in its walls in front of the engine cylinders permitting direct impingement upon them of the air currents due to relative movement of the engine and the surrounding air, and also having means of exit for the air entering at the front; and means in said casing for receiving the air entering it in front as aforesaid and diverting and directing the air so received against the rear of said cylinders.

4. The combination with an aerially traveling multiple cylinder internal combustion engine of radial or coplanar type; of a casing or cowling structure about said engine of substantially stream-line form extending with diminishing size ahead of the engine cylinders, said casing being open in front, and having forward-open insets in its walls in front of the engine cylinders permitting direct access to them of the air currents due to relative movement of the engine and the surrounding air, and also having means of exit for the air entering at the front; conduit means in said casing opening forward between the engine cylinders to receive air entering the latter in front as aforesaid; and nozzle means discharging against the rear of the cylinders cooling jets of the air received by said conduit means.

5. The combination with an aerially traveling multiple cylinder internal combustion engine of radial or coplanar type; of a casing or cowling structure about said engine of substantially stream-line form extending with diminishing size ahead of the engine cylinders, said casing being open in front, and having forward-open insets in its walls in front of the engine cylinders permitting direct access to them of the air current due to relative movement of the engine and the surrounding air, and also having means of exit for the air entering at the front.

6. The combination with an aerially traveling multiple cylinder internal combustion engine having its cylinders cooled in front by impingement thereon of an air current due to relative movement of the engine and the surrounding air; of means for diverting and directing against the rear of the cylinders fresh air from the current due to relative movement of the engine and the surrounding air; and means for preventing flow of cooling air to said cylinders at front or rear during coasting.

7. The combination with an aerially traveling multiple cylinder internal combustion engine of radial or coplanar type; of a casing or cowling structure about said engine of substantially stream-line form extending with diminishing size ahead of the engine cylinder, said casing being open in front, and having forward-open insets in its walls in front of the engine cylinders permitting direct impingement upon them of the air currents due to relative movement of the engine and the surrounding air, and also having means of exit for the air entering at the front; means in said casing for receiving the air entering it in front as aforesaid and diverting and directing the air so received against the rear of said cylinders; and means for preventing flow of cooling air to said cylinders at front or rear during coasting.

In testimony whereof, I have hereunto signed my name at Philadelphia, Pennsylvania, this 22nd day of June, 1920.

JOHN W. SMITH.

Witnesses:
JAMES H. BELL,
E. L. FULLERTON.